(12) United States Patent
Harvey

(10) Patent No.: US 7,697,196 B2
(45) Date of Patent: Apr. 13, 2010

(54) TUNEABLE OPTICAL AMPLIFIER OR OPTICAL PARAMETRIC OSCILLATOR

(76) Inventor: John Harvey, 58 Symonds Street, Auckland (NZ)

( * ) Notice: Subject to any disclaimer, the term of this patent is extended or adjusted under 35 U.S.C. 154(b) by 512 days.

(21) Appl. No.: 10/558,869

(22) PCT Filed: May 31, 2004

(86) PCT No.: PCT/NZ2004/000110

§ 371 (c)(1), (2), (4) Date: Oct. 6, 2006

(87) PCT Pub. No.: WO2004/107034

PCT Pub. Date: Dec. 9, 2004

(65) Prior Publication Data

US 2007/0110375 A1    May 17, 2007

(30) Foreign Application Priority Data

May 30, 2003    (NZ) .................................... 526219

(51) Int. Cl.
- G02F 1/39 (2006.01)
- G02F 1/365 (2006.01)
- G02B 6/036 (2006.01)
- H04B 10/17 (2006.01)

(52) U.S. Cl. .............. 359/330; 359/341.1; 385/126; 372/23

(58) Field of Classification Search ........... 359/330, 359/341.1; 385/126; 372/23
See application file for complete search history.

(56) References Cited

U.S. PATENT DOCUMENTS

| | | | | |
|---|---|---|---|---|
| 5,053,641 A | * | 10/1991 | Cheng et al. ............ | 359/330 |
| 5,249,189 A | * | 9/1993 | Scheps .................... | 372/20 |
| 6,501,591 B1 | * | 12/2002 | Kumar et al. ............ | 359/330 |
| 6,757,096 B2 | * | 6/2004 | Schiller .................. | 359/330 |
| 6,801,356 B2 | * | 10/2004 | Broderick et al. ........ | 359/332 |
| 2002/0063947 A1 | * | 5/2002 | Islam ...................... | 359/334 |
| 2005/0047741 A1 | * | 3/2005 | Sfez ........................ | 385/129 |

OTHER PUBLICATIONS

Sharping et al. "Optical parametric oscillator based on four-wave mixing in microstructure fiber", Optics Letters, vol. 27 No. 19, pp. 1675-1677 (Oct. 1, 2002).*

Blit et al. "Continuous wave uv radiation tunable from 285 nm to 400 nm by harmonic and sum frequency generation", Applied Optics, vol. 17 No. 5, pp. 721-723 (Mar. 1, 1978).*

(Continued)

*Primary Examiner*—Eric Bolda
(74) *Attorney, Agent, or Firm*—Dann, Dorfman, Herrell and Skillman, P.C.

(57) ABSTRACT

A parametric process is provided for producing visible light at a second wavelength including pumping an optical fiber (4) with input light (1) at a first wavelength of less than one micron, which is longer than the second wavelength, and wherein the optical fiber (4) has zero group velocity dispersion at a third wavelength in the visible or near infrared region and longer than the first wavelength. An optical amplifier that uses the parametric process for producing light at second wavelength is also provided. The optical fiber (4) may be a photonic crystal fiber. The parametric process is tuneable by adjusting the frequency of the zero group velocity dispersion, the frequency of the first wavelength or the birefringence of the optical fiber (4).

43 Claims, 2 Drawing Sheets

OTHER PUBLICATIONS

Blit et al., "Continuous wave uv radiation tunable from 285 nm to 400nm by harmonic and sum frequency generation", Applied Optics, vol. 17, No. 5, pp. 721-723 (Mar. 1, 1978).*

Sharping et al., "Optical parametric oscillator based on four-wave mising in micorstructure fiber", Opticsl Letters, vol. 27, No. 19, pp. 1675-1677 (Oct. 1, 2002).*

* cited by examiner

TUNEABLE OPTICAL AMPLIFIER OR OPTICAL PARAMETRIC OSCILLATOR

FIELD OF INVENTION

The invention relates to devices that convert light from one wavelength to another and in particular but not exclusively to a photonic crystal fibre based optical parametric oscillator that converts red or infrared light to a lower wavelength visible light and to a higher wavelength light.

BACKGROUND

A source of coherent tuneable blue, green, or yellow light would have a substantial number of potential applications. A means of converting readily available red laser diode radiation into blue, green, or yellow light would also be advantageous. However, there are presently no solid state tuneable lasers operating at these wavelengths. Tuneable optical parametric oscillators operating at very high peak powers are too expensive to use in everyday optical fibre systems.

Previous fibre optic parametric oscillators have used a pump the in the anomalous dispersion region close to the zero group velocity dispersion (GVD) of the fibre, where the parametric amplification gain is also called the modulation instability. The two wavelengths generated by this method are closely spaced around the pump wavelength, and cannot be used to extend the tuning range far from the pump wavelength.

Conventional optical fibres have a central core surrounded by glass with a slightly different composition to the central core. Typically the central core is doped so that it has a different refractive index to the surrounding glass. Light travelling down the central core of the fibre is confined by the interface between the fibre and the surrounding glass.

In the last few years a non-standard type of optical fibre has been demonstrated, called the photonic crystal fibre. Typically, this is made from a single solid, and substantially transparent, material such as silica within which is embedded an array of air holes, running parallel to the fibre axis and extending the full length of the fibre. The arrangement of air holes in the array may be periodic but need not be and the air holes may be filled with a material other than air. A defect, for example, in the form of a single missing air hole within the regular array forms a region of raised refractive index within which light is guided, in a manner analogous to total-internal-reflection guiding in standard fibres. Another mechanism for guiding light in a photonic crystal fibre is based on photonic-band-gap effects rather than total internal reflection. Photonic-band-gap guidance can be obtained by suitable design of the array of air holes. Light with particular propagation constants can be confined to an air core and will propagate therein. A photonic crystal fibre can be fabricated by stacking glass canes, some of which are capillaries on a macroscopic scale, into the required shape, and then holding them in place while fusing them together and drawing them down into a fibre. A photonic crystal fibre has unusual properties such as the ability to guide light in a single-mode over a very broad range of wavelengths, and to guide light having a relatively large mode area which remains single-mode.

Photonic crystal fibres have the potential to greatly increase the number of fibre based optical devices as they have a wide range of properties that can be engineered to suit the application.

SUMMARY OF THE INVENTION

It is the object of the invention to provide a tuneable optical amplifier or optical parametric oscillator that can convert visible or near infra red pump light (with wavelength less than 1 micron) to a range of other wavelengths or to at least provide a useful choice.

According to a first aspect, the present invention provides a parametric process for producing visible light at a second wavelength by pumping an optical fibre with input light at a first wavelength of less than one micron, which is longer than the second wavelength, wherein the optical fibre has zero group velocity dispersion at a third wavelength, which is in the visible or near infrared region and is longer than the first wavelength.

In broad terms in another aspect the invention comprises a parametric process for producing light at a second wavelength and light at a fourth wavelength by pumping an optical fibre with input light at a first visible or near infrared wavelength, said first wavelength being longer than said second wavelength and shorter than said fourth wavelength, and wherein the optical fibre has near zero group velocity dispersion at a third wavelength, which is in the visible or near infrared region and is longer than the first wavelength.

The parametric process always ensures the simultaneous production of light at a fourth wavelength which is longer than that of the input light (also called the pump). The wavelengths of the second and fourth wavelengths are equally spaced in frequency from the frequency of the pump radiation.

According to a third aspect, the present invention provides an optical amplifier that uses a parametric process for producing light at a second wavelength, comprising: a pump source, for providing light at a first visible wavelength; an output for delivering visible light at a second wavelength, which is shorter than the first wavelength; and an optical fibre, arranged to receive from the pump source light into an input end and deliver light to the output from an output end, wherein the optical fibre has near zero group velocity dispersion at a third wavelength, which is in the visible or near infrared region and is longer than the first wavelength.

In preferred embodiments, the optical fibre is a photonic crystal fibre.

Preferably the first wavelength is a red wavelength. More particularly, the first wavelength may be visible red or near infra red (between 600 nm and 1000 nm). In one embodiment, the first wavelength is around 647 nm. As already indicated, this enables embodiments of the invention to take advantage of readily available solid state pump lasers, which are available at these wavelengths.

The input light of the first wavelength may be continuous wave (CW) or pulsed. Preferably the light is CW in order to simplify the pump source. Preferably the input light of the first wavelength has a relatively narrow line width. More preferably the line width of the input light of the first wavelength is narrower than 1 nm.

The second wavelength is preferably shorter than 600 nm.

The second wavelength may be a visible wavelength in the orange, yellow, green or blue region (between 400 and 600 nm).

According to a fourth aspect, the present invention provides an optical parametric oscillator, comprising an optical amplifier as described above and, further including a feedback path including a delay line, the feedback path being arranged to feed back to the input end of the optical fibre a fraction of the light output from the output end of the optical fibre.

BRIEF DESCRIPTION OF DRAWINGS

The invention will be further described by way of example only and without intending to be limiting with reference to the following drawings, wherein.

DETAILED DESCRIPTION

Scalar modulation instability, which leads to the breakup of an intense continuous wavelength (CW) beam, is the simplest form of modulation instability that can occur in optical fibres. This process can also be viewed as a four wave mixing process, leading to the development of symmetrically placed sidebands on either side of the pump wavelength, whose position is determined by the phase matching condition. The conventional analysis of scalar modulation instability (also called parametric amplification) shows that modulation instability gain is only obtained in the anomalous dispersion region where the wave-vector mismatch $\Delta k = \beta_2 \Omega^2$ is balanced by self phase modulation, where $\Delta k$ is the phase mismatch, $\beta_2$ is the dispersion parameter, and $\Omega$ is the frequency shift of the sidebands. Using this theory, the modulation instability gain vanishes for $\beta_2 > 0$.

This conventional analysis is based on the one dimensional nonlinear Schrödinger equation (NLSE), which leads to the widely accepted results that scalar modulation instability occurs only in the anomalous dispersion regime of a single mode optical fibre. This conclusion however, is a result of using a nonlinear Schrödinger equation derived using a Taylor expansion of the propagation constant up to second order.

In a photonic crystal fibre there is a strong waveguide dispersion contribution to the dispersion profile. This means that the conventional approximation of expanding the dispersion constant to second order is inadequate. The use of the nonlinear Schrödinger equation to study modulation instability shows that the odd order terms do not contribute to the condition governing the parametric gain of the sidebands, and consequently the first higher order term to be important is the fourth order dispersion term.

In a photonic crystal fibre according to the embodiments of the present invention, the steady state solution to the equation governing the propagation of pulses down the fibre in the presence of nonlinearity and dispersion (the nonlinear Schrödinger equation) is given by $A = \sqrt{P} \exp(i\gamma P z)$. This is perturbed at frequency $\Omega$ by substituting:

$$A = (\sqrt{P} + a) \exp(i\gamma P z)$$

and linearising the resulting equation for the perturbation where $$a(z, T) = a_1 \cos(kz - \Omega T) + i a_2 \sin(kz - \Omega T)$$

this yields the following dispersion relation:

$$k = \frac{\beta_3 \Omega^3}{6} \pm \left\{ \left( \frac{\beta_2 \Omega^2}{2} + \frac{\beta_4 \Omega^4}{24} \right) \left( \frac{\beta_2 \Omega^2}{2} + \frac{\beta_4 \Omega^4}{24} + 2\gamma P \right) \right\}^{1/2}$$

where it is clear that an imaginary wave number (corresponding to gain for the perturbation) is obtained only for $\beta_2 + \beta_4 \Omega^2/12 < 0$, and $|\beta_2 + \beta_4 \Omega^2/12| \Omega^2 < 4\gamma P$. This defines a relatively narrow frequency region close to that given by the linear phase matching condition $\Omega = [-12\beta_2/\beta_4]^{1/2}$.

Figure 3:
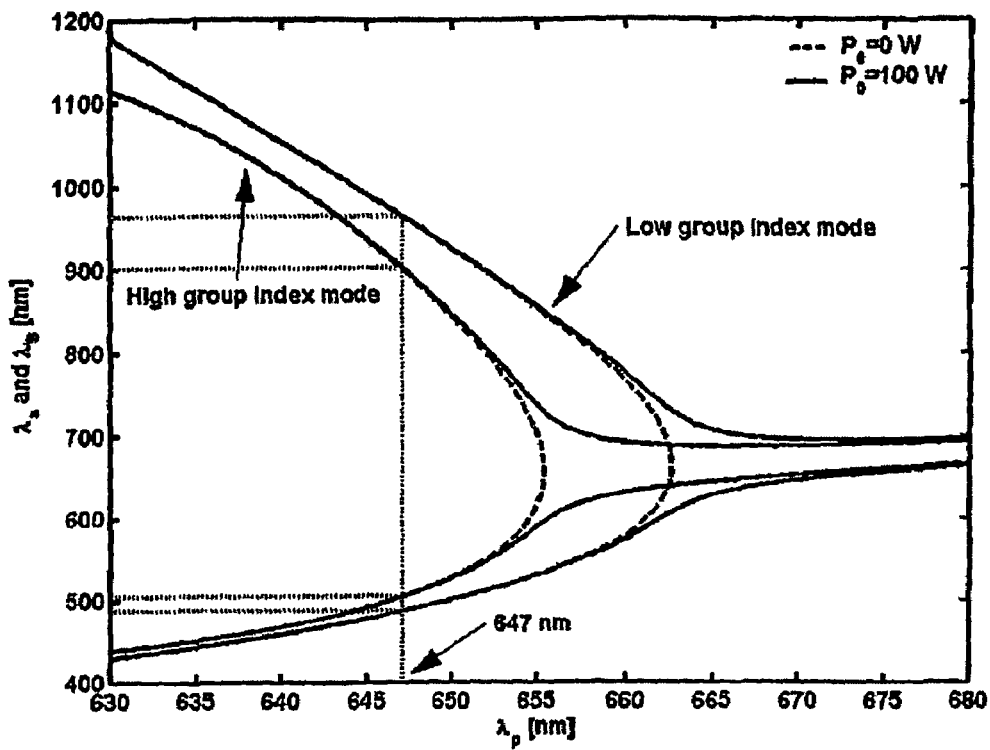
FIG. 3 shows the phase matching conditions which explain the operation of the frequency converter.

An example of the consequences of this phase matching condition is shown in FIG. 3 which applies to the fibre used in the experiments reported here. FIG. 3 shows the consequences of phase matching. As can be seen in FIG. 3 as the pump wavelength $\lambda_p$ changes the wavelengths of the upper and lower sidebands also change. FIG. 3 shows the results for two levels of input power and two pump polarisations, the dashed line represents pump power of 0 W and the solid line represents pump power of 100 W. The two solid lines represent the wavelengths produced when different polarisations of the pump light are applied to the photonic crystal fibre. As can be seen in this Figure when the fibre is pumped at 647 nm two sidebands are produced, one at about 500 nm and the other at about 900 nm. For a different polarisation and the same pump wavelength the sidebands are produced at about 490 and 960 nm.

The use of a PCF dispersion shifted into the visible ensures that $\beta_4$ (the fourth order dispersion term) is relatively large and of opposite sign to $\beta_2$ in the normal dispersion region close to the zero dispersion wavelength.

Using a photonic crystal fibre with zero group velocity dispersion in the red region of the spectrum, this relationship predicts parametric gain for wavelengths from deep blue to orange for a red pump wavelength depending on the relative values of (the second and fourth order dispersion terms) $\beta_2$ and $\beta_4$.

A photonic crystal fibre may readily be dispersion shifted into the visible or near infra red region of the spectrum to take advantage of the solid state pump lasers which are available at these wavelengths. The technique of dispersion shifting a photonic crystal fibre is well known. The use of such a dispersion shifted photonic crystal fibre allows the efficient generation of light at a shorter wavelength (blue, green, yellow or orange), which can readily be tuned by tuning the pump source over a relatively much smaller wavelength range. Use of a photonic crystal fibre enables the phase matching of any desired wavelength in the visible region to that of the pump wavelength and another wavelength in the infra red when pumping the fibre in the normal dispersion regime near to the zero dispersion wavelength (also called the zero group velocity dispersion wavelength). The strong waveguide contribution to the dispersion curve of a photonic crystal fibre materially assists this phase matching process, which does not occur, or only occurs over a very small region close to the zero dispersion wavelength when using conventional waveguides, which only permit the production of fibres with a zero dispersion wavelength longer than 1.25 microns in silica based fibres. The decreased effective area of the propagation mode of a photonic crystal fibre also greatly enhances the nonlinear and parametric effects over standard fibres designed to be single mode in the region of the pump wavelength.

Figure 1:
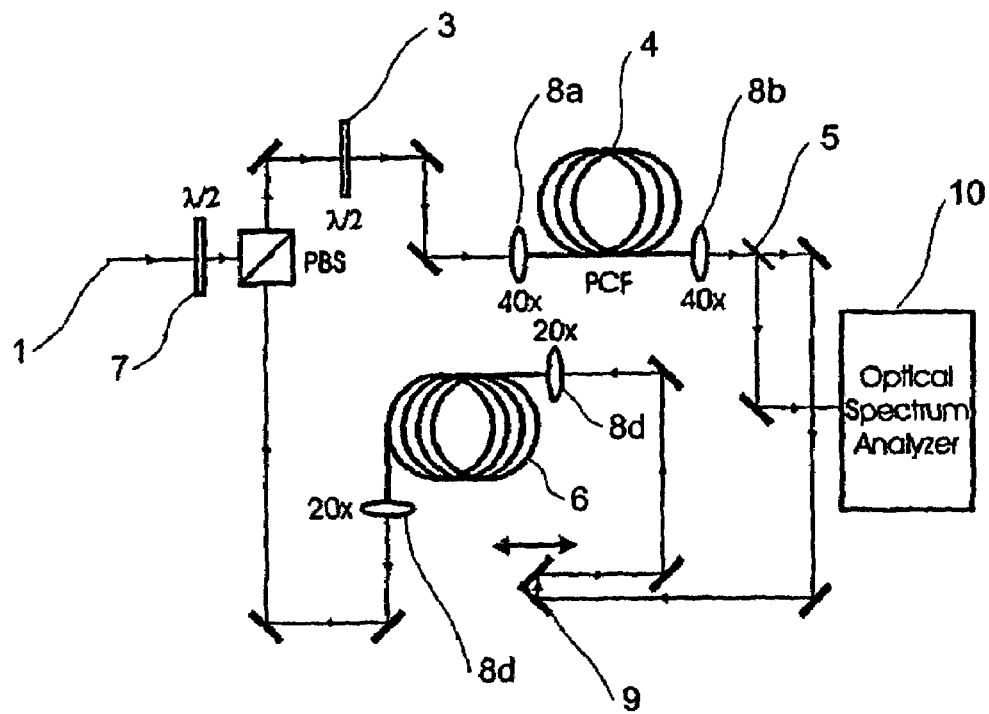
FIG. 1 shows one embodiment of the invention that can be operated as a optical parametric oscillator or tuneable amplifier including a feedback system.

FIG. 1 shows a feedback system arranged to produce blue, green, orange, or yellow output light from red input light. The feedback system includes input light pump 1, a PBS 2 (polarising beam splitter) arranged to mix the input beam and the feedback beam, half wave plates 3 and 7, a photonic crystal fibre 4, a feedback mirror 5, delay line 6, lenses 8a to 8d, retroreflector 9, and optical spectrum analyser 10.

The half wave plates are used to adjust the polarisation of the input beam before an after the PBS. Lenses 8a and 8c are used to focus light before entry into fibres 4 and 6. Lenses 8b and 8d are used to collimate light once it emerges from fibres 4 and 6 respectively. Delay fibre 6 can be any fibre and is used to delay the feedback light. Any suitable light delay device may be used in place of delay fibre 6. Retroreflector 9 reflects back light on a parallel path to the input light. Retroreflector 9 is used to provide a continuously variable time delay for the fed back pulse so that the fed back pulse is synchronised with the next pump pulse. Any suitable variable feedback delay device could be used in place of retroreflector 9. Feedback mirror 5 splits the output of PCF 4. Part of the output of PCF 4 is directed to the feed back system via retroreflector 9 and part of the output of the PCF is directed out of the optical parametric oscillator. The split of light at feedback mirror 5 may not be even and more light may be directed to one part of the device than directed out of the device or vice versa. In the present optical parametric oscillator the output light from the oscillator is provided to optical spectrum analyser 10. Optical spectrum analyser 10 analyses the spectrum of the output light. In alternative embodiments the output light can be provided to any required device or system.

The system arrangement in FIG. 1 is that of an optical parametric oscillator. If the feedback loop is not in place or is not properly synchronised with the pump the device could be operated as an optical amplifier. Note that synchronisation of the feedback loop with the pump is only required when the pump is pulsed. Synchronisation of the feedback loop with the pump is not required when the pump is continuous.

Pump light is provided to the feedback system as input light 1. This light is at any wavelength close to but slightly less than the wavelength of the zero dispersion wavelength (ZDW) of the photonic crystal fibre (PCF), but to produce blue or green light it is advantageous to have a pump and ZDW in the yellow/orange/red region of the spectrum. For example the input light may be at 647 nm as in these experiments. The pump has a wavelength of less than one micron.

The photonic crystal fibre has a small core diameter with a large "air filling fraction". Using input light with a wavelength of 647 nm enables the use of readily available solid state pump lasers. However input light at other wavelengths can also be used so long as the input light is at a shorter wavelength than and near the zero group velocity dispersion wavelength.

In experimental embodiments to date, narrow wavelength light has been generated between 480 nm (blue) and 580 nm (yellow) using different fibres and a fixed pump wavelength or from 500 nm (blue/green) to 640 nm (red) using one fibre and a pump tuneable over 10 nm.

The frequency converter can be tuned by several means including adjusting the birefringence of the photonic crystal fibre, adjusting the position of the zero group velocity dispersion, changing the stress or other influences on the fibre or by changing the pump wavelength. In experimental embodiments, narrow wavelength light has been generated between 480 nm (blue) and 580 nm (yellow) using different fibres and a fixed pump or from 500 nm (blue/green) to 640 nm (red) using one fibre tuneable over 10 nm.

Normally a laser operates on essentially one wavelength (i.e. it has a very narrow line width) but sometimes lasers are operated at more wavelengths. Line width is broadened when the laser is mode locked (generating short pulses). In preferred embodiments the line width is narrow. In the most preferred embodiment a continuous wavelength laser is used with a very narrow line width. For example the line width may be narrower than 1 nm.

FIG. 1 shows the light converter arranged as an optical parametric oscillator with a feedback loop in place. The advantage of using a feedback loop is that less input power is needed to produce the sidebands.

A further advantage of using a feedback loop is that a narrower line width can be achieved in the output light. For example in producing green light the FWHM (full wavelength at half maximum) may be about 2 nm, while with feedback the pump power and delay can be adjusted so that the FWHM is only about 10 nm.

Figure 2:
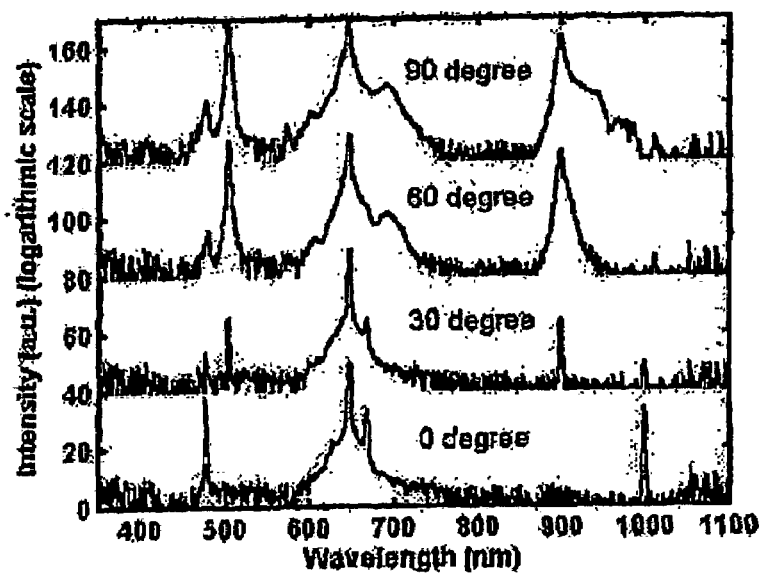
FIG. 2 shows output spectra obtained as the pump polarisation is adjusted when feedback is blocked from the feedback system of FIG. 1.

FIG. 2 shows the output spectra obtained from the set-up of FIG. 1 when the light converter is arranged as a tuneable optical amplifier, i.e. with the feedback loop disabled. In the four results in FIG. 2 the polarisation of the pump light was adjusted to be the amounts shown in this Figure. This is consistent with the graph shown in FIG. 3 that shows that changing the polarisation of the pump wavelength alters the wavelengths of the light produced by the optical amplifier or optical parametric oscillator. Similar spectra at a lower pump power are obtained when operating the light converter as an optical parametric oscillator with a fixed pump polarisation.

EXAMPLE 1

Using the set-up of FIG. 1 light was pumped through a photonic crystal fibre. The pump laser used was a modelocked cavity dumped $Kr^+$ laser providing 70 ps pulses with peak powers up to 1 kW at 647 nm. The photonic crystal fibre used was slightly birefringent with group velocity dispersion zeros close to 655 nm on each axis. This resulted in strong visible sidebands in the blue/green region as well as infrared sidebands. Up to 25% of the light coupled into the fibre was converted into the blue/green region of the spectrum.

EXAMPLE 2

Figure 4:
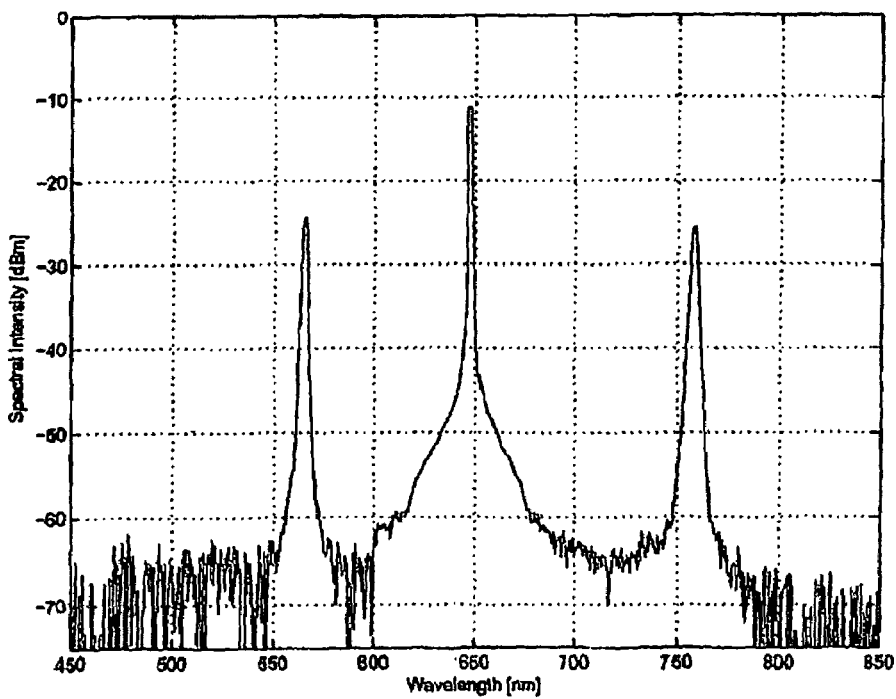
FIG. 4 shows the output spectrum obtained with a different fibre having a zero dispersion wavelength at 650 nm (very close to the pump wavelength) where the system efficiently generates yellow (580 nm) and deep red light (750 nm).

In another experiment a different photonic crystal fibre with a slightly smaller core diameter was used. Again the set-up of FIG. 1 was used with the delay line in place. Input light was provided by a modelocked cavity dumped $Kr^+$ laser providing 70 ps pulses with a wavelength of 647 nm. The system efficiently converts the red pump light into yellow (at about 580 nm) and near infrared (at about 750 nm) sidebands by parametric frequency conversion as shown in FIG. 4.

Although the description has focused on the use of a photonic crystal fibre as part of the light converter it should be noted that it is expected that any optical fibre in which the zero group velocity dispersion can be shifted into the visible or near infrared region could be used.

The foregoing describes the invention including preferred forms thereof. Alterations and modifications as will be obvious to those skilled in the art are intended to be incorporated in the scope hereof as defined in the accompanying claims.

The invention claimed is:

1. A parametric process for producing visible light at a second wavelength shorter than 600 nm including the steps of pumping an optical fibre which has zero group velocity dispersion at a third wavelength in the visible or near infrared region with input light at a first wavelength of less than one micron, above 600 nm, and less than said third wavelength, selected to thereby produce visible light at said second wavelength.

2. A parametric process for producing visible light at a second wavelength as claimed in claim 1 further including the simultaneous production of light at a fourth wavelength which is longer than that of the first wavelength.

3. A parametric process for producing visible light at a second wavelength as claimed in claim 1 wherein the parametric process is tuneable by adjusting the frequency of the zero group velocity dispersion.

4. A parametric process for producing visible light at a second wavelength as claimed in claim 1 wherein the parametric process is tuneable by adjusting the frequency of the first wavelength.

5. A parametric process for producing visible light at a second wavelength as claimed in claim 1 wherein the parametric process is tuneable by adjusting the birefringence of the optical fibre.

6. A parametric process for producing visible light at a second wavelength as claimed claim 1 wherein the fibre is a photonic crystal fibre.

7. A parametric process for producing visible light at a second wavelength as claimed claim 1 wherein the first wavelength is a red wavelength.

8. A parametric process for producing visible light at a second wavelength as claimed in claim 7 wherein the first wavelength is visible red or near infra red (between 600 nm and 1000 nm).

9. A parametric process for producing visible light at a second wavelength as claimed in claim 8 wherein the first wavelength is around 647 nm.

10. A parametric process for producing visible light at a second wavelength as claimed claim 1 wherein the input light of the first wavelength is continuous wave (CW).

11. A parametric process for producing visible light at a second wavelength as claimed claim 1 wherein the input light of the first wavelength is pulsed.

12. A parametric process for producing visible light at a second wavelength as claimed claim 1 wherein the input light of the first wavelength has a relatively narrow line width.

13. A parametric process for producing visible light at a second wavelength as claimed in claim 12 wherein the line width of the input light of the first wavelength is narrower than 1 nm.

14. A parametric process for producing visible light at a second wavelength as claimed in claim 8 wherein the second wavelength is a visible wavelength in the orange, yellow, green or blue region (between 400 and 600 nm).

15. An optical amplifier that uses a parametric process in the normal dispersion regime for producing light at a second wavelength shorter than 600 nm, comprising:
a pump source providing light at a first visible wavelength of less than one micron and above 600 nm;
an output delivering visible light at a second wavelength, which is shorter than the first wavelength; and
an optical fibre receiving from the pump source light into an input end and delivering light to the output from an output end, the optical fibre having zero group velocity dispersion at a third wavelength in the visible or near infrared region and longer than the first wavelength.

16. An optical amplifier as claimed in claim 15 which simultaneously produces light at a fourth wavelength which is longer than that of the first wavelength.

17. An optical amplifier as claimed in claim 15 which is tuneable by adjusting the frequency of the zero group velocity dispersion.

18. An optical amplifier as claimed in claim 15 which is tuneable by adjusting the frequency of the first wavelength.

19. An optical amplifier as claimed in claim 15 which is tuneable by adjusting the birefringence of the optical fibre.

20. An optical amplifier as claimed in claim 15 wherein the fibre is a photonic crystal fibre.

21. An optical amplifier as claimed in claim 15 wherein the first wavelength is a red wavelength.

22. An optical amplifier as claimed in claim 21 wherein the first wavelength is visible red or near infrared (between 600 nm and 1000 nm).

23. An optical amplifier as claimed in claim 22 wherein the first wavelength is around 647 nm.

24. An optical amplifier as claimed in claim 15 wherein the input light of the first wavelength is continuous wave.

25. An optical amplifier as claimed in claim 15 wherein the input light of the first wavelength is pulsed.

26. An optical amplifier as claimed in claim 15 wherein the input light of the first wavelength has a relatively narrow line width.

27. An optical amplifier as claimed in claim 26 wherein the line width of the input light of the first wavelength is narrower than 1 nm.

28. An optical amplifier as claimed in claim 22 wherein the second wavelength is a visible wavelength in the orange, yellow, green or blue region (between 400 and 600 nm).

29. An optical amplifier as claimed in claim 15 further including a feedback path including a delay line, the feedback path being arranged to feed back to the input end of the optical fibre a fraction of the light output from the output end of the optical fibre.

30. A parametric process for producing visible light at a second wavelength as claim in claim 2 wherein the parametric process is tuneable by adjusting the frequency of the zero group velocity dispersion.

31. A parametric process for producing visible light at a second wavelength as claim in claim 2 wherein the parametric process is tuneable by adjusting the frequency of the zero group velocity dispersion.

32. A parametric process for producing visible light at a second wavelength as claim in claim 2 wherein the parametric process is tuneable by adjusting the frequency of the zero group velocity dispersion.

33. A parametric process for producing visible light at a second wavelength as claim in claim 2 wherein the parametric process is tuneable by adjusting the frequency of the zero group velocity dispersion.

34. A parametric process for producing visible light at a second wavelength as claim in claim 2 wherein the parametric process is tuneable by adjusting the frequency of the zero group velocity dispersion.

35. A parametric process for producing visible light at a second wavelength as claim in claim 2 wherein the parametric process is tuneable by adjusting the frequency of the zero group velocity dispersion.

36. A parametric process for producing visible light at a second wavelength as claim in claim 2 wherein the parametric process is tuneable by adjusting the frequency of the zero group velocity dispersion.

37. A parametric process for producing visible light at a second wavelength as claim in claim 2 wherein the parametric process is tuneable by adjusting the frequency of the zero group velocity dispersion.

38. An optical amplifier as claimed in claim 16 which is tuneable by adjusting the frequency of the zero group velocity dispersion.

39. An optical amplifier as claimed in claim 16 which is tuneable by adjusting the frequency of the first wavelength.

40. An optical amplifier as claimed in claim 16 which is tuneable by adjusting the birefringence of the optical fibre.

41. An optical amplifier as claimed in claim 16 wherein the fibre is a photonic crystal fibre.

42. An optical amplifier as claimed in claim 16 wherein the first wavelength is a red wavelength.

43. An optical amplifier as claimed in claim 42 wherein the first wavelength is visible red or near infra red (between 600 nm and 1000 nm).

* * * * *